Nov. 8, 1938.　　　O. J. WITZKE　　　2,135,995
FLUXING DEVICE
Filed Dec. 16, 1937　　　2 Sheets-Sheet 1
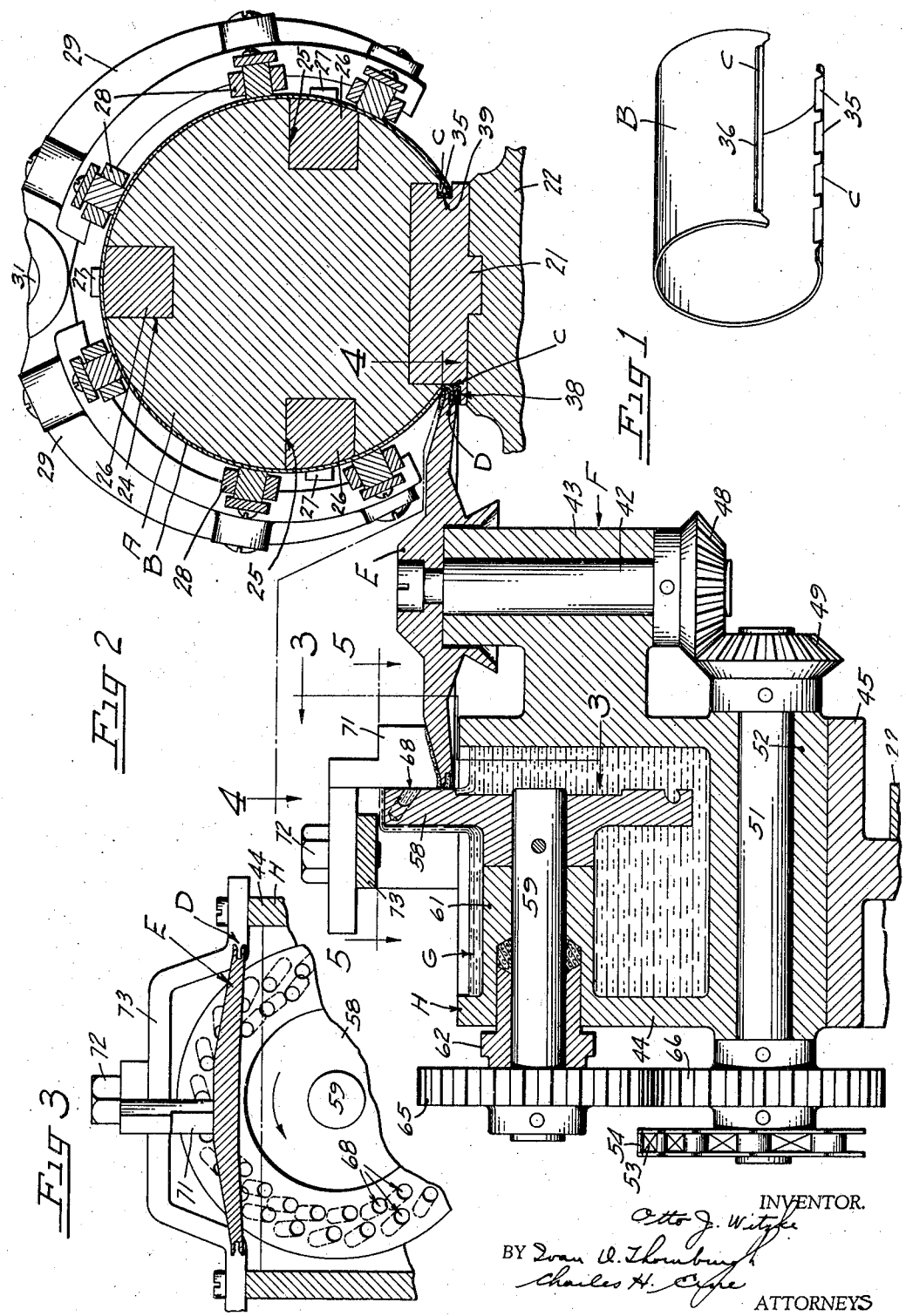
INVENTOR.
Otto J. Witzke
BY Ivan W. Thornburg
Charles H. Cype
ATTORNEYS Nov. 8, 1938.   O. J. WITZKE   2,135,995
FLUXING DEVICE
Filed Dec. 16, 1937   2 Sheets-Sheet 2
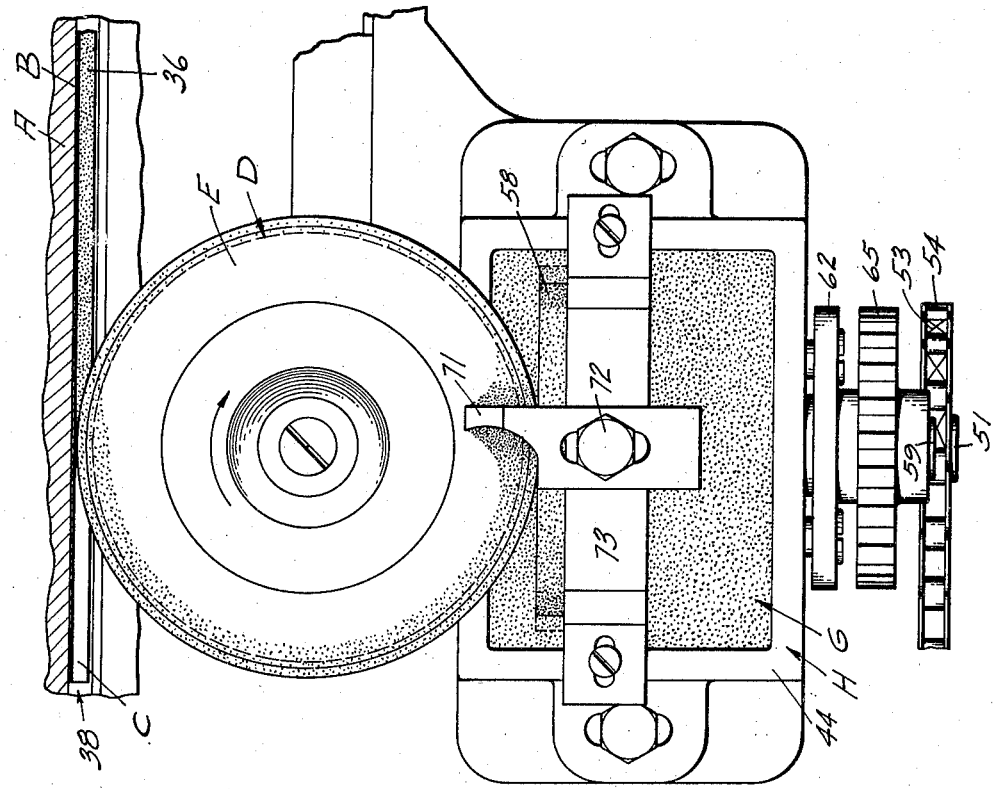
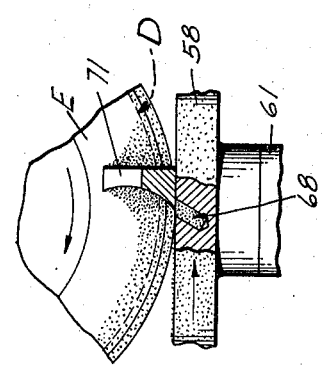
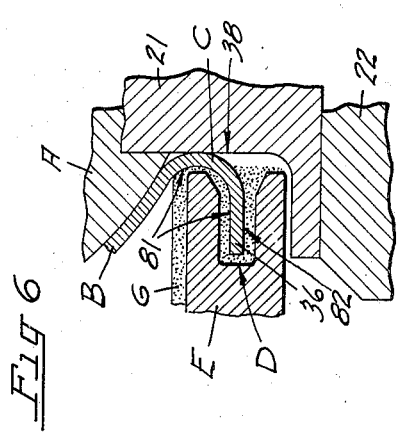
INVENTOR.
Otto J. Witzke
BY Ivan D. Thornburgh
Charles H. Cuff
ATTORNEYS Patented Nov. 8, 1938

2,135,995

UNITED STATES PATENT OFFICE 2,135,995

FLUXING DEVICE

Otto J. Witzke, San Francisco, Calif., assignor to American Can Company, New York, N. Y., a corporation of New Jersey Application December 16, 1937, Serial No. 180,204

3 Claims. (Cl. 113—95)

The present invention relates to a can body making machine or the like and has particular reference to a liquid flux applying mechanism which will deliver a regulated amount of liquid flux to the outside surface as well as the inside surface of a side seam hook of a can body passing through the can body making machine.

In making can bodies it is the usual practice to apply a liquid flux such as for example, phosphoric acid or the like, to the inside surfaces of one of the can body side seam hooks so that when the hooks are soldered, after having been interengaged and pressed into a side seam, the solder will readily flow into the seam and form a bond between the hooks. It has been found that for certain types of can bodies a strong liquid flux such as mentioned above is not satisfactory but that when a weaker flux is used with usual methods of fluxing such is not strong enough to properly draw the solder into the seam and an unsatisfactory bond results. The present invention contemplates overcoming these difficulties by depositing the flux on both the inside and the outside surfaces of the can body side seam hook so that the weaker as well as the stronger fluxes can be used.

An object, therefore, of the invention, is the provision of a flux applying mechanism suitable as an attachment for a can body making machine wherein a regulated and adequate amount of liquid flux will be delivered and properly distributed onto the outside and also the inside surfaces of a side seam hook of a passing can body so that solder when applied to the can body side seam will readily flow into the inner regions thereof and properly bond the side seam parts together.

Numerous other objects and advantages of the invention will be apparent as it is better understood from the following description, which, taken in connection with the accompanying drawings, discloses a preferred embodiment thereof.

Referring to the drawings:

Figure 1 is a perspective view of an open or incomplete can body with its side seam hooks disengaged, this being the condition of the body before and during the fluxing operation;

Fig. 2 is a transverse sectional view taken through a can body maker horn and through a flux applying mechanism embodying the present invention;

Fig. 3 is a sectional detail of a portion of the flux applying mechanism as viewed substantially along the broken line 3—3 in Fig. 2;

Fig. 4 is a combination plan and sectional view taken substantially along the broken line 4—4 in Fig. 2;

Fig. 5 is a fragmentary detail in plan and in section as viewed substantially along the line 5—5 in Fig. 2; and Fig. 6 is an enlarged sectional detail of a side seam hook as arranged on a horn as it passes through the flux applying operation.

To more clearly present a preferred embodiment of the invention and to show the effects of operation of the improved flux applying mechanism on can bodies, the drawings disclose a portion of a can body mandrel or horn A (Fig. 2) along which partially formed can bodies B having side seam hooks C are advanced past the several well known operating stations, including the fluxing station, of a can body making machine. The drawings show only the fluxing station and illustrate how, at this station, one of the side seam hooks C of the advancing can body receives a deposit of flux as the body moves along the horn.

The can seam hook C to be fluxed advances through a groove D formed in a rotating fluxing wheel E of a fluxing mechanism F. The groove receives a regulated quantity of flux G, which may be either the weaker or the stronger fluxes, from a flux pot or receptacle H (see also Fig. 2). The groove completely surrounds the hook C of the can body as it moves along the horn and thus deposits the proper amount of flux on the outside surface of the hook as well as the inside surface. It is to this feature that the invention is particularly directed.

The mandrel A is preferably mounted on a block 21 which is carried on a body making machine frame 22. The mandrel may be formed with longitudinal top and side grooves 24, 25 in the usual manner and feed bars 26 operating in these grooves propel the can bodies B along the mandrel. These feed bars 26 are provided with the usual spring dogs 27 which engage behind the edge of a can body B and move it forward each time the bars move forward on its reciprocating travel. During this passage of the can bodies B along the mandrel A they are held in place by guide rails 28 carried in side wings 29 mounted on a support bar 31 suitably confined in the usual manner.

The side seam hooks C of the can body B may vary in style, size, etc., according to the kind of can being produced. One style of side seam hooks as shown in Fig. 1 comprises a series of hook sections 35 which are turned inwardly and a long continuous hook section 36 which is turned outwardly. It is this latter outwardly turned hook section on which the flux is applied.

When the can body B is advanced along the fluxing section of the mandrel A, the hook sections 35, 36 are spread apart as shown in Fig. 2. The hook section 36 is guided by a shoulder 38 formed in one side of the block 21 while the hook sections 35 are guided in a groove 39 formed in the opposite side of the block.

The fluxing mechanism F is located adjacent the mandrel A with the outer periphery of its horizontal fluxing wheel E disposed adjacent the can body hook guiding shoulder 38 and with the fluxing groove D of the wheel in line with the path of travel of the body hook 36 as the body advances along the mandrel. The fluxing wheel E is mounted on the upper end of a vertical shaft 42 which is carried in a bearing 43 formed on a casing 44 constituting the flux pot H which contains the flux C. The flux pot is supported on a bracket 45 which is secured in any suitable manner to the frame 22 of the can body making machine.

The fluxing wheel E is rotated in time with the passage of can bodies B along the mandrel A. For this purpose the fluxing wheel shaft 42 carries a bevel gear 48 which meshes with a similar bevel gear 49 pinned to the inner end of a horizontal drive shaft 51. The drive shaft is journaled in a bearing 52 formed in the flux pot casing 44. At its outer end the drive shaft carries a drive sprocket 53 which is rotated by a chain 54 leading to any suitable source of power operating in time with the moving parts of the can body making machine.

The fluxing wheel E carries flux G from the flux pot H toward the mandrel A and deposits it on the hook 36 of the passing can body B as clearly shown in Fig. 6. The wheel E is continuously supplied with a regulated but adequate amount of this flux by a vertically disposed flux supply roller 58 which is located in the flux in the pot H with its inner face engaging against the periphery of the wheel. The roller is pinned to the inner end of a horizontal shaft 59 which is journaled in a bearing 61 formed on the flux pot casing 44. A stuffing box 62 is provided for the shaft so that the flux will be prevented from leaking out of the casing.

The roller 58 is rotated in the flux G by a gear 65 which is secured to the outer end of the shaft 59. This gear 65 meshes with a driving gear 66 which is mounted on the drive shaft 51 adjacent the drive sprocket 53. The inner face of the roller 58 is provided with a plurality of angularly disposed pockets 68 which help carry up the flux G as the roller rotates therein and which empty their contents out onto the top of the outer marginal edge of the fluxing wheel E as the latter rotates in time with the roller.

The deposit of flux thus delivered onto the fluxing wheel E is spread out to a predetermined thickness by a scraper 71 which is adjustably secured by a bolt 72 to an arched cross bar 73 which is mounted on top of the flux pot casing 44. The scraper also extends down parallel with and engages against the inner face of the fluxing roller 58 and thus scrapes the flux off the face of the roller. The action of the scraper besides cleaning off the face of the fluxing roller 58 and regulating the thickness of the flux delivered onto the fluxing wheel E, also causes the flux to flow down over the outer edge of the wheel so that it will be deposited into the groove D. It is this regulated quantity of flux on the top of the wheel and in its filled groove D which is carried around to the hook 36 of the can body B on the mandrel A.

Hence, as a can body B advances along the mandrel A, its hook 36 passes into the groove D of the synchronized rotating wheel E, as best show in Figs. 2 and 6. The flux G is thus deposited on the inner surfaces of the can body hook 36, these surfaces being indicated by the numeral 81 in Fig. 6 and also is deposited on the outer surface (marked 82) of the hook. Thus when the hooked edges 35, 36 are incorporated into a side seam the flux G is in such position as to provide a more complete fluxing action thus facilitating the drawing of just the required amount of solder into the seam to effect a stronger bond between the hooks of the completed side seam.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a can body making machine, the combination of a mandrel for supporting can bodies having side seam hooks, means for advancing can bodies along said mandrel, a fluxing wheel disposed adjacent said mandrel for applying a liquid flux onto one of said can body side seam hooks, and means for applying said liquid flux to said fluxing wheel, said fluxing wheel having a peripheral groove therein which receives a quantity of the liquid flux and which also receives said hook as said can body advances along said mandrel thereby depositing said liquid flux on the outside surface and also on the inside surface of said hook.

2. A flux applying mechanism comprising in combination a flux receptacle for containing a liquid flux, a flux applying wheel mounted on said flux receptacle and having a peripheral groove adapted to receive the inner and the outer surfaces of the side seam hook of a can body and to deposit flux thereon, a flux supply roller mounted in said flux receptacle and rotating within the flux contained therein and at right angles to the rotation of said flux applying wheel to deposit flux thereon, and means for rotating said wheel and said roller.

3. A flux applying mechanism comprising in combination a flux receptacle for containing a liquid flux, a flux applying wheel mounted on said flux receptacle and having a peripheral groove adapted to receive the inner and the outer surfaces of the side seam hook of a can body and also adapted to deposit flux on said surfaces while in said groove, a scraper mounted to extend over said flux applying roller and adapted to discharge flux thereon, a flux supply roller mounted in said flux receptacle and adapted to rotate within the flux contained therein and at right angles to the rotation of said flux applying wheel to deposit flux onto said scraper, and means for rotating said wheel and said roller.

OTTO J. WITZKE.